US011946224B2

(12) United States Patent
Hijikata et al.

(10) Patent No.: US 11,946,224 B2
(45) Date of Patent: Apr. 2, 2024

(54) CONSTRUCTION MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Kenji Hiraku, Kasumigaura (JP); Masatoshi Hoshino, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 57 days.

(21) Appl. No.: 17/909,085

(22) PCT Filed: Apr. 7, 2021

(86) PCT No.: PCT/JP2021/014799
§ 371 (c)(1),
(2) Date: Sep. 2, 2022

(87) PCT Pub. No.: WO2021/256059
PCT Pub. Date: Dec. 23, 2021

(65) Prior Publication Data
US 2023/0085648 A1 Mar. 23, 2023

(30) Foreign Application Priority Data
Jun. 17, 2020 (JP) ................................ 2020-104899

(51) Int. Cl.
*F15B 1/04* (2006.01)
*E02F 9/22* (2006.01)
(Continued)

(52) U.S. Cl.
CPC .......... *E02F 9/2228* (2013.01); *E02F 9/2217* (2013.01); *E02F 9/2271* (2013.01);
(Continued)

(58) Field of Classification Search
CPC .. F15B 1/04; F15B 1/024; F15B 1/033; F15B 21/14; F15B 2211/212; F15B 2211/327;
(Continued)

(56) References Cited

U.S. PATENT DOCUMENTS 9,290,912 B2 * 3/2016 Wen ........................ F15B 13/06
2014/0119867 A1 5/2014 Wen et al.
(Continued)

FOREIGN PATENT DOCUMENTS

JP 2009-275769 A 11/2009
JP 2009-275771 A 11/2009
(Continued)

OTHER PUBLICATIONS

International Search Report (PCT/ISA/210) issued in PCT Application No. PCT/JP2021/014799 dated Jun. 15, 2021 with English translation (four (4) pages).
(Continued)

*Primary Examiner* — Thomas E Lazo
(74) *Attorney, Agent, or Firm* — Crowell & Moring LLP

(57) ABSTRACT

The object of the present invention resides in provision of a construction machine in which a hydraulic cylinder can be driven in a high efficiency by an accumulator. To this end, the construction machine including: a hydraulic cylinder; a first accumulator that accumulates return fluid from the hydraulic cylinder with a first set pressure; a tank that stores hydraulic fluid therein; a first hydraulic pump that delivers the hydraulic fluid sucked from the tank; a hydraulic actuator that is driven by the first hydraulic pump; and a second accumulator that accumulates return fluid from the hydraulic actuator with a second set pressure, includes a first control valve placed in a first hydraulic line that connects the first accumulator and the hydraulic cylinder to each other, and a second control valve placed in a second hydraulic line that connects the second accumulator and the hydraulic cylinder to each other. The second set pressure is set to a value higher than that of the first set pressure.

5 Claims, 6 Drawing Sheets

(51) Int. Cl.
*F15B 1/26* (2006.01)
*F15B 13/02* (2006.01)

(52) U.S. Cl.
CPC .............. *E02F 9/2292* (2013.01); *F15B 1/04* (2013.01); *F15B 1/26* (2013.01); *F15B 13/02* (2013.01); *F15B 2211/6306* (2013.01)

(58) Field of Classification Search
CPC ...... F15B 2211/6306; F15B 2211/6313; E02F 9/2217; E02F 9/2228
See application file for complete search history.

(56) References Cited

U.S. PATENT DOCUMENTS

| | | | | |
|---|---|---|---|---|
| 2014/0119868 | A1 * | 5/2014 | Wen | E02F 9/123 60/459 |
| 2017/0204887 | A1 * | 7/2017 | Matsuzaki | F15B 21/14 |

FOREIGN PATENT DOCUMENTS

| | | | | | |
|---|---|---|---|---|---|
| JP | 2012-197823 | A | | 10/2012 | |
| JP | 2015-31365 | A | | 2/2015 | |
| JP | 2016-500796 | A | | 1/2016 | |
| WO | WO 2017/170352 | A1 | | 10/2017 | |
| WO | WO-2017170352 | A1 | * | 10/2017 | E02F 9/22 |

OTHER PUBLICATIONS

Japanese-language Written Opinion (PCT/ISA/237) issued in PCT Application No. PCT/JP2021/014799 dated Jun. 15, 2021 (three (3) pages).

International Preliminary Report on Patentability (PCT/IB/338 and PCT/IB/373) issued in PCT Application No. PCT/JP2021/014799 dated Dec. 29, 2022, including English translation of document C2 (Japanese-language Written Opinion (PCT/ISA/237), filed on Sep. 2, 2022) (five (5) pages).

* cited by examiner

CONSTRUCTION MACHINE

TECHNICAL FIELD

The present invention relates to a construction machine such as a hydraulic excavator.

BACKGROUND ART

According to Patent Document 1, at the time of boom lowering operation, by communicating the bottom side and the rod side of a boom cylinder with each other and further connecting the bottom side to an accumulator, it is possible to increase the pressure of return fluid from the boom cylinder and accumulate the return fluid of the increased pressure into the accumulator. Further, according to Patent Document 2, the fuel cost can be reduced by supplying hydraulic fluid accumulated in an accumulator to a boom cylinder and reducing the flow rate to be fed from a pump to the boom cylinder as much.

PRIOR ART DOCUMENT

Patent Documents

Patent Document 1: JP-2009-275769-A
Patent Document 2: JP-2009-275771-A

SUMMARY OF THE INVENTION

Problem to be Solved by the Invention

In the configuration of Patent Document 1 or 2, while hydraulic fluid is accumulated with a fixed pressure in the accumulator, the bottom pressure of the boom cylinder changes in response to operation of a front implement including an arm and a bucket. Therefore, in a state in which the bottom pressure of the boom cylinder is low, high pressure loss occurs when the hydraulic fluid is supplied from the accumulator to the bottom side, and there is the possibility that the energy accumulated in the accumulator may not be used effectively.

The present invention has been made in view of the subject described above, and the object of the present invention resides in provision of a construction machine in which a hydraulic cylinder can be driven in a high efficiency by an accumulator.

Means for Solving the Problem

In order to attain the object described above, according to the present invention, there is provided a construction machine that includes a hydraulic cylinder, a first accumulator that accumulates return fluid from the hydraulic cylinder with a first set pressure, a tank that stores hydraulic fluid therein, a first hydraulic pump that delivers the hydraulic fluid sucked from the tank, a hydraulic actuator that is driven by the first hydraulic pump, and a second accumulator that accumulates return fluid from the hydraulic actuator with a second set pressure, the construction machine including a first control valve placed in a first hydraulic line that connects the first accumulator and the hydraulic cylinder to each other, and a second control valve placed in a second hydraulic line that connects the second accumulator and the hydraulic cylinder to each other, in which the second set pressure is set to a value higher than that of the first set pressure.

According to the present invention configured in such a manner as described above, by opening one of the first control valve and the second control valve, it is possible to connect one of the first accumulator on the low pressure side and the second accumulator on the high pressure side to the hydraulic cylinder. Consequently, since pressure loss when hydraulic fluid is supplied from the first accumulator 4 or the second accumulator 21 to the hydraulic cylinder 1 is suppressed, the hydraulic cylinder 1 can be driven efficiently.

Advantages of the Invention

With the construction machine according to the present invention, the hydraulic cylinder can be driven efficiently by the accumulator

MODES FOR CARRYING OUT THE INVENTION

Figure 1:
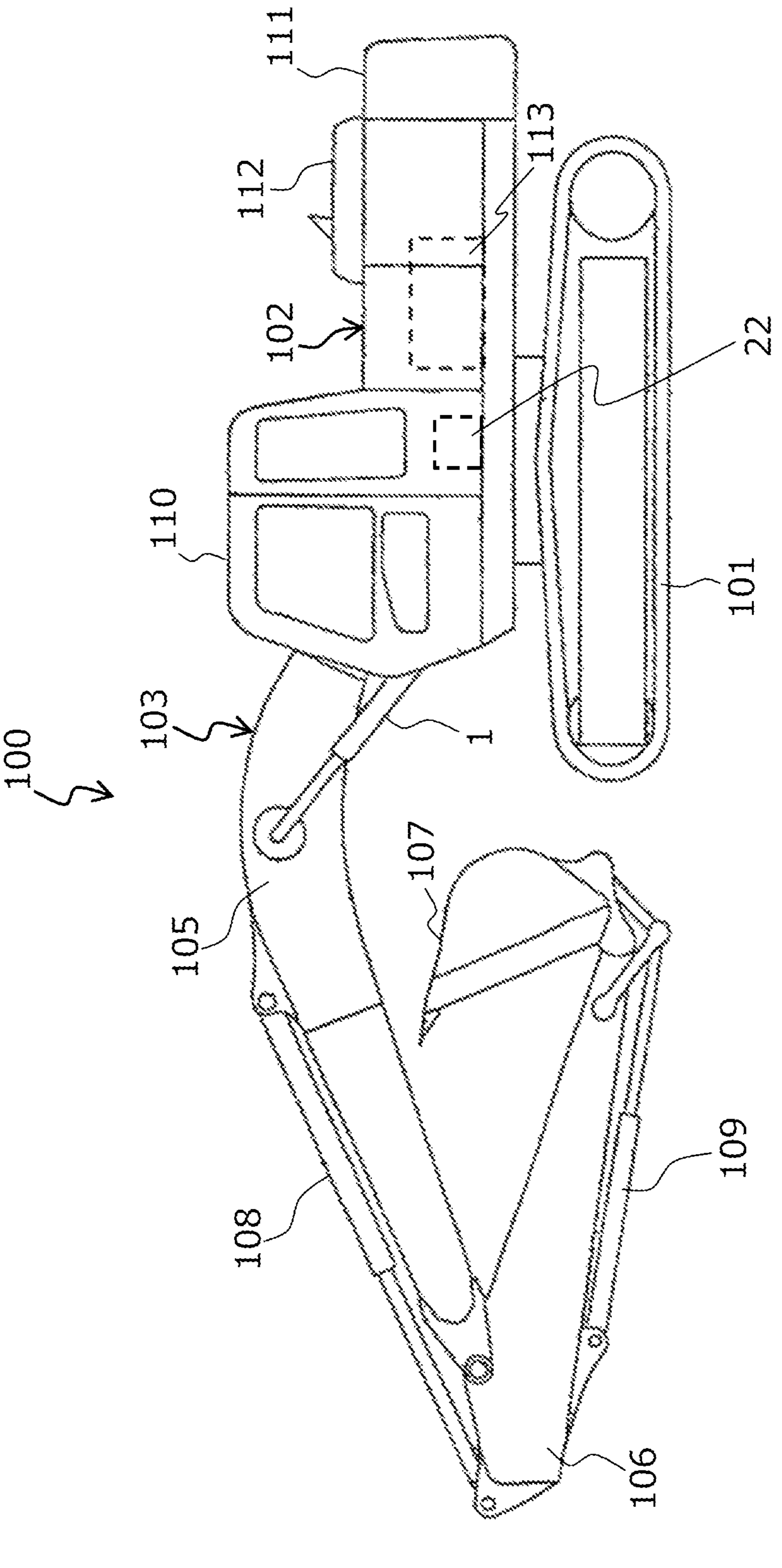
FIG. 1 is a side elevational view of a hydraulic excavator according to an embodiment of the present invention.

In the following, a construction machine according to an embodiment of the present invention is described in detail with reference to the drawings taking a hydraulic excavator as an example of the construction machine. It is to be noted that, in the figures, like members are denoted by like reference characters and overlapping description of them is suitably omitted herein.

FIG. 1 is a side elevational view of the hydraulic excavator according to the present embodiment.

As depicted in FIG. 1, the hydraulic excavator 100 includes a track structure 101, a swing structure 102 swingably placed on the track structure 101 and configuring a machine body, and a work implement 103 mounted pivotally in an upward and downward direction on the swing structure 102 such that it performs an excavation work of sediment and so forth.

The swing structure 102 is driven by a swing motor 22.

The work implement 103 includes a boom 105 mounted pivotally in the upward and downward direction on the swing structure 102, an arm 106 mounted pivotally in the upward and downward direction at a distal end of the boom 105, and a bucket 107 mounted pivotally in the upward and downward direction at a distal end of the arm 106. The boom 105 is driven by a boom cylinder 1; the arm 106 is driven by an arm cylinder 108; and the bucket 107 is driven by a bucket cylinder 109.

An operation room 110 is provided at a front side position on the swing structure 102, and a counterweight 111 for assuring weight balance is provided at a rear side position on the swing structure 102. A machine room 112 is provided between the operation room 110 and the counterweight 111. The machine room 112 accommodates an engine, a hydraulic pump, a control valve 113, and so forth therein. The control valve 113 controls the flow of hydraulic fluid to be supplied from the hydraulic pump to the actuators.

Figure 2:
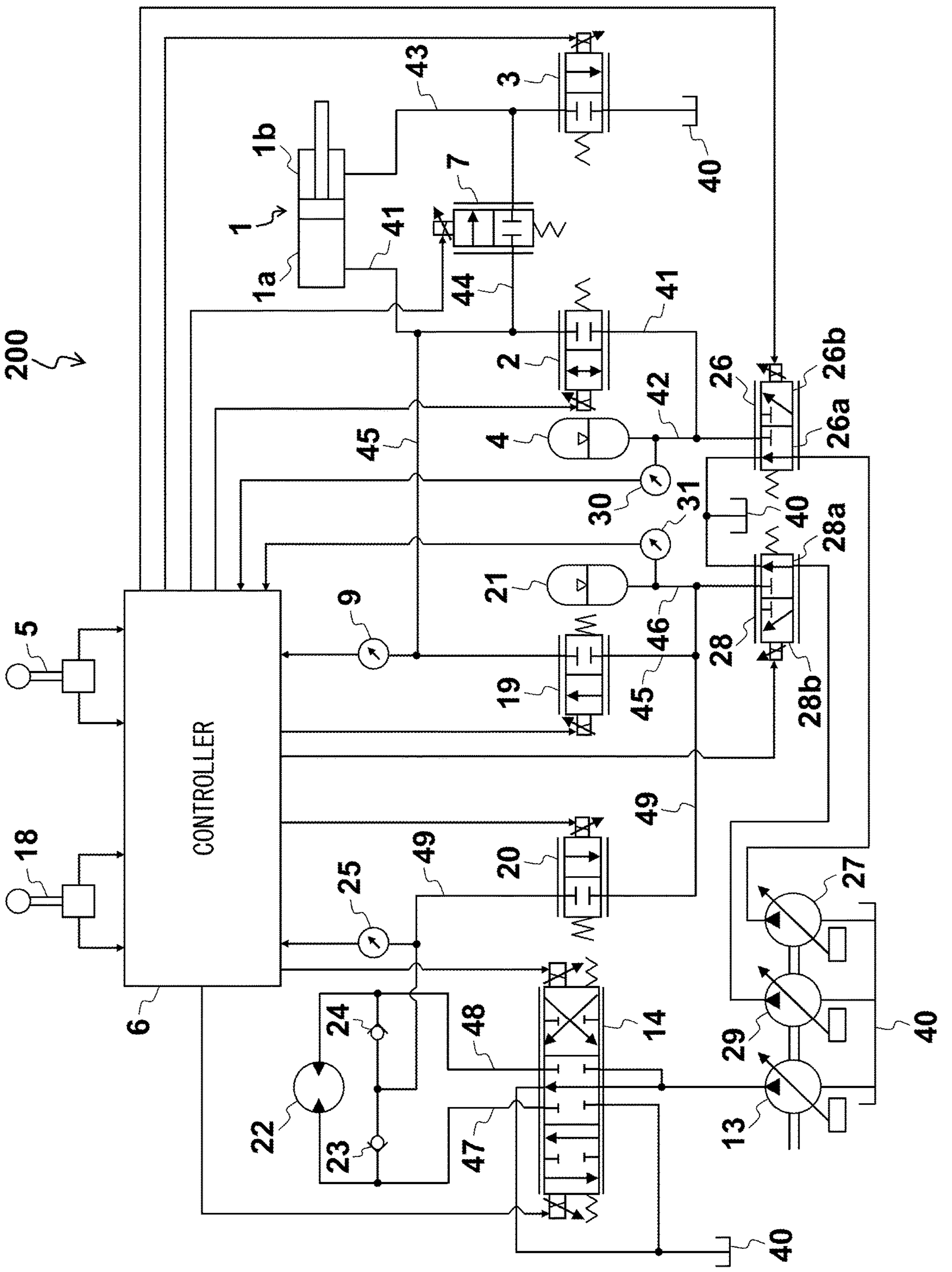
FIG. 2 is a circuit diagram of a hydraulic drive system incorporated in the hydraulic excavator depicted in FIG. 1.

FIG. 2 is a circuit diagram of a hydraulic drive system incorporated in the hydraulic excavator 100.

An accumulator 4 is hydraulic equipment that accumulates return fluid from the bottom side of the boom cylinder 1 and supplies the hydraulic fluid when the boom cylinder 1 is to be elongated. The accumulator 4 and a bottom side fluid chamber 1*a* of the boom cylinder 1 are connected to each other through hydraulic lines 41 and 42, and a control valve 2 is placed in the hydraulic line 41. The control valve 2 receives a control signal from a controller 6 and establishes communication or interruption in the hydraulic line 41. A pressure sensor 30 for sensing the pressure of the accumulator 4 is provided in the hydraulic line 42, and a signal of the pressure sensor 30 is inputted to the controller 6.

A rod side fluid chamber 1*b* of the boom cylinder 1 and a tank 40 are connected to each other by a hydraulic line 43, and a control valve 3 is placed in the hydraulic line 43. The control valve 3 receives a control signal from the controller 6 and establishes communication or interruption in the hydraulic line 43.

A hydraulic line portion of the hydraulic line 41 by which the bottom side fluid chamber 1*a* and the control valve 2 are connected to each other is connected to a hydraulic line portion of the hydraulic line 43 by which the rod side fluid chamber 1*b* and the control valve 3 are connected to each other through a hydraulic line 44, and a control valve 7 is placed in the hydraulic line 44. The control valve 7 receives a control signal from the controller 6 and establishes communication or interruption in the hydraulic line 44. The controller 6 switches the control valve 7 to its communication position when a boom lowering operation signal is inputted thereto from a boom operation lever 5 to communicate the bottom side of the boom cylinder 1 with the rod side, and by this, the pressure of the bottom side can be increased.

Meanwhile, a hydraulic line portion of the hydraulic line 41 by which the bottom side fluid chamber 1*a* and the control valve 2 are connected to each other is connected to an accumulator 21 through hydraulic lines 45 and 46, respectively, and a control valve 19 is placed in the hydraulic line 45. The control valve 19 receives a control signal from the controller 6 and establishes communication or interruption in the hydraulic line 45. At a hydraulic line portion of the hydraulic line 45 by which the control valve 19 and the hydraulic line 41 are connected to each other, a pressure sensor 9 for sensing the bottom pressure of the boom cylinder 1 is provided, and a signal of the pressure sensor 9 is inputted to the controller 6. The controller 6 switches each of the control valves 2, 3, and 19 to a communication position or an interruption position in response to an operation signal inputted from the boom operation lever 5 (a boom raising operation signal or a boom lowering operation signal) and a bottom pressure of the boom cylinder 1 sensed by the pressure sensor 9.

The swing motor 22 is connected to a hydraulic pump 13 and the tank 40 via a directional control valve 14. The directional control valve 14 receives a control signal from the controller 6 and is switched to one of left and right positions from a neutral position. If the directional control valve 14 is switched to one of the left and right positions, then delivery hydraulic fluid of the hydraulic pump 13 flows into one of ports of the swing motor 22, and the hydraulic fluid discharged from the other port of the swing motor 22 is returned to the tank 40. Consequently, the swing motor 22 is driven to swing the swing structure 102 to one of leftward and rightward directions. The controller 6 switches the directional control valve 14 to one of the left and right positions from the neutral position in response to an operation signal inputted from a swing operation lever 18.

The hydraulic lines 47 and 48 that connect the directional control valve 14 and the swing motor 22 to each other are connected to a hydraulic line 49 via check valves 23 and 24, respectively, such that hydraulic fluid on the high pressure side of the hydraulic lines 47 and 48 flows into the hydraulic line 49. The hydraulic line 49 is connected to the hydraulic line 46, and a control valve 20 is placed in the hydraulic line 49. In a hydraulic line portion of the hydraulic line 49 by which the check valves 23 and 24 and the control valve 20 are connected to each other, a pressure sensor 25 is provided, and a signal of the pressure sensor 25 is inputted to the controller 6. The controller 6 switches the control valve 20 to a communication position or an interruption position in response to a pressure of the hydraulic line 49 sensed by the pressure sensor 25 (the pressure on the high pressure side of the hydraulic lines 47 and 48). The accumulator 21 accumulates return hydraulic fluid of the swing motor 22 via the control valve 20 and supplies the accumulated hydraulic fluid to the boom cylinder 1 via the control valve 19.

Here, a set pressure for the accumulators 24 and 21 is described. The accumulator 4 is used principally in order to recover return hydraulic fluid of the boom cylinder 1, and the accumulator 21 is used principally in order to recover return hydraulic fluid of the swing motor 22. The set pressure for the accumulator 4 is set to a value close to the bottom pressure of the boom cylinder 1 in order to suppress pressure loss when return hydraulic fluid of the boom cylinder 1 flows into the accumulator 4 thereby to assure a high recovery efficiency of energy. Similarly, the set pressure for the accumulator 21 is set to a value close to the return pressure of the swing motor 22 in order to suppress pressure loss when return hydraulic fluid of the swing motor 22 flows into the accumulator 21 thereby to assure a high recovery efficiency of energy. It is to be noted that, since the return pressure of the swing motor 22 is higher than the bottom pressure of the boom cylinder 1, the set pressure for the accumulator 21 is higher than the set pressure for the accumulator 4.

A hydraulic pump 27 is hydraulic equipment principally for accumulating pressurized fluid into the accumulator 4, and the delivery port of the hydraulic pump 27 is connected to the accumulator 4 via a control valve 26 and the hydraulic line 42. The control valve 26 receives a control signal from the controller 6 and is switched from an unload position 26*a* to a charge position 26*b* thereof. When the control valve 26 is in the unload position 26*a*, delivery hydraulic fluid of the hydraulic pump 27 is discharged to the tank 40, and if the control valve 26 is switched to the charge position 26*b*, then delivery hydraulic fluid of the hydraulic pump 27 is accumulated into the accumulator 4. In the hydraulic line 42, the pressure sensor 30 for sensing the pressure of the accumulator 4 is provided, and a signal of the pressure sensor 30 is inputted to the controller 6. The controller 6 switches the control valve 26 to the unload position 26*a* or the charge position 26*b* in response to a pressure of the accumulator 4 sensed by the pressure sensor 30.

A hydraulic pump 29 is hydraulic equipment principally for accumulating pressurized fluid into the accumulator 21, and the delivery port of the hydraulic pump 29 is connected to the accumulator 21 via a control valve 28 and the hydraulic line 46. The control valve 28 receives a control signal from the controller 6 and is switched from an unload position 28*a* to a charge position 28*b*. When the control valve 28 is in the unload position 26*a*, delivery hydraulic fluid of the hydraulic pump 27 is discharged to the tank 40, and if the control valve 28 is switched to the charge position 26*b*, then delivery hydraulic fluid of the hydraulic pump 29 is accumulated into the accumulator 21. In the hydraulic line 46, a pressure sensor 31 for sensing the pressure of the accumulator 21 is provided, and a signal of the pressure sensor 31 is inputted to the controller 6. The controller 6 switches the control valve 28 to the unload position 28*a* or the charge position 28*b* in response to a pressure of the accumulator 21 sensed by the pressure sensor 30.

Figure 3:
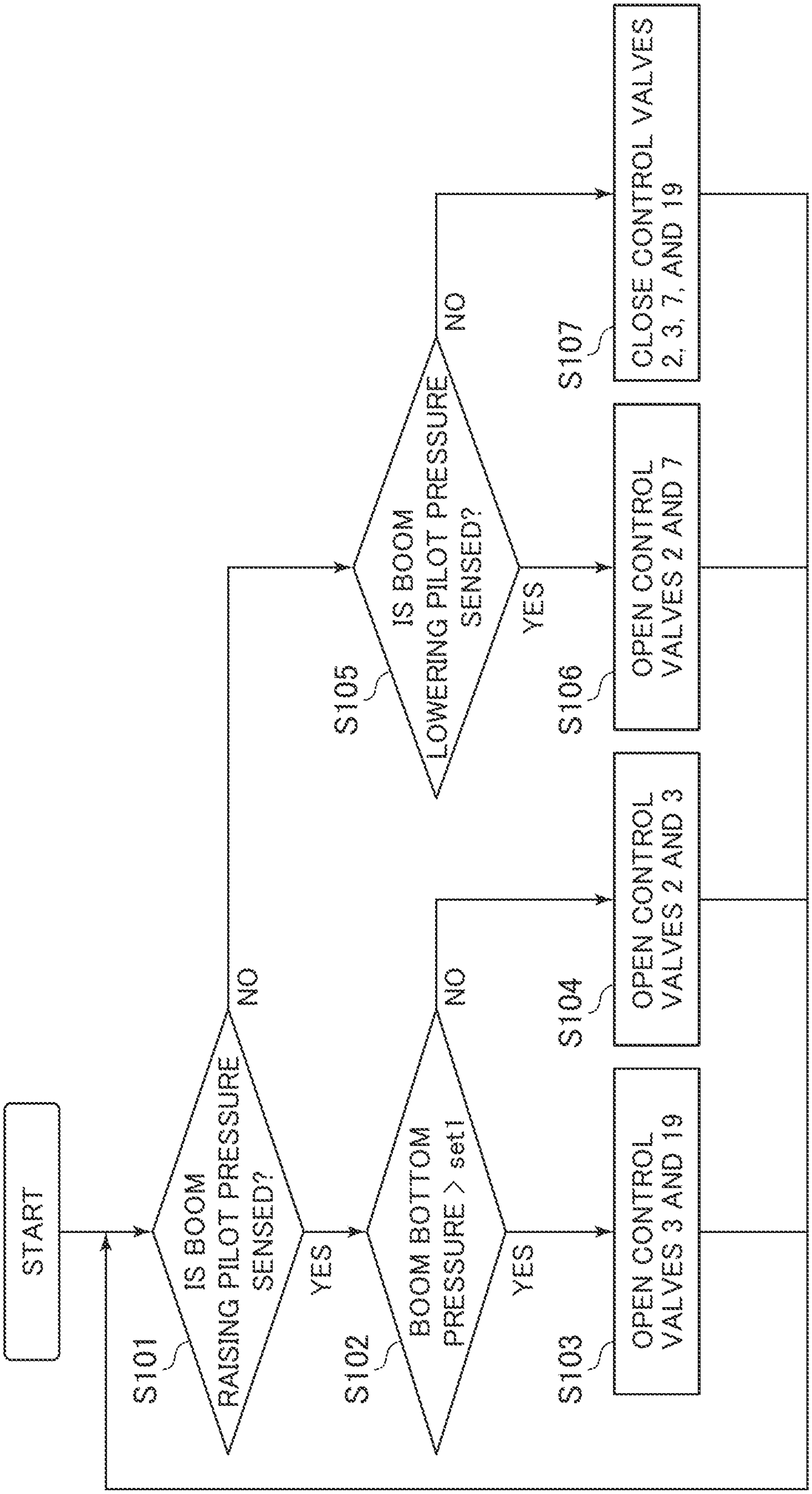
FIG. 3 is a flow chart depicting a control flow relating to driving of a boom cylinder, executed by a controller depicted in FIG. 2.
Figure 4:
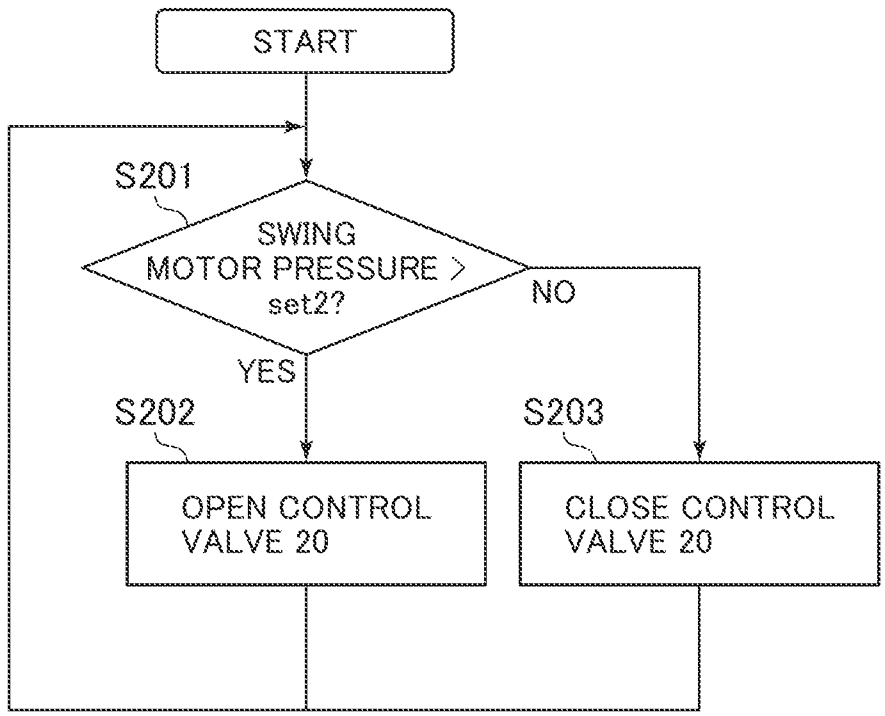
FIG. 4 is a flow chart depicting a control flow relating to regeneration operation of a swing motor, executed by the controller depicted in FIG. 2.
Figure 5:
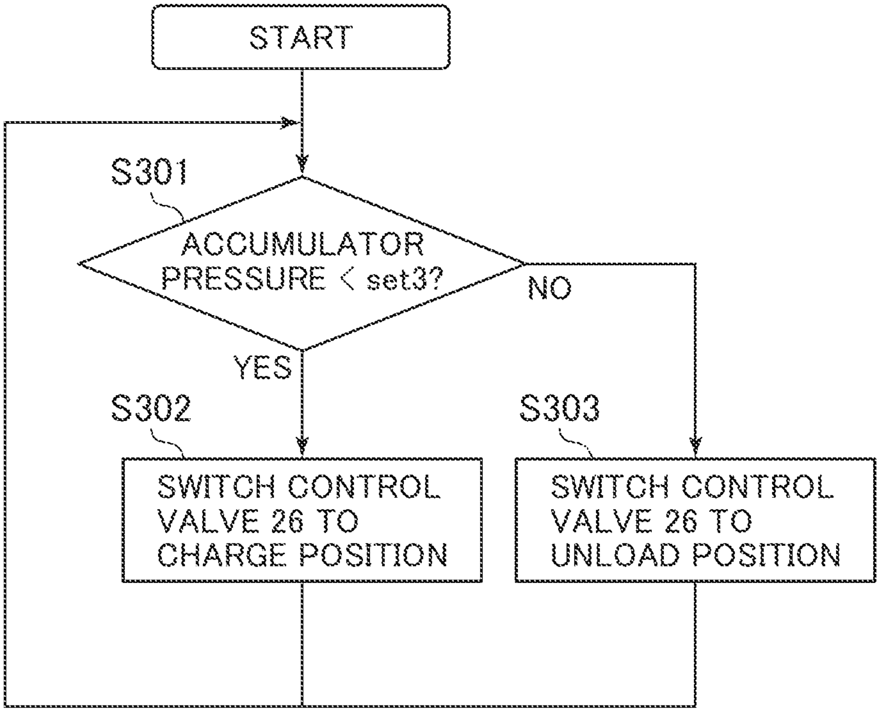
FIG. 5 is a flow chart depicting a control flow relating to pressure accumulation operation of an accumulator on the low pressure side, executed by the controller depicted in FIG. 2.
Figure 6:
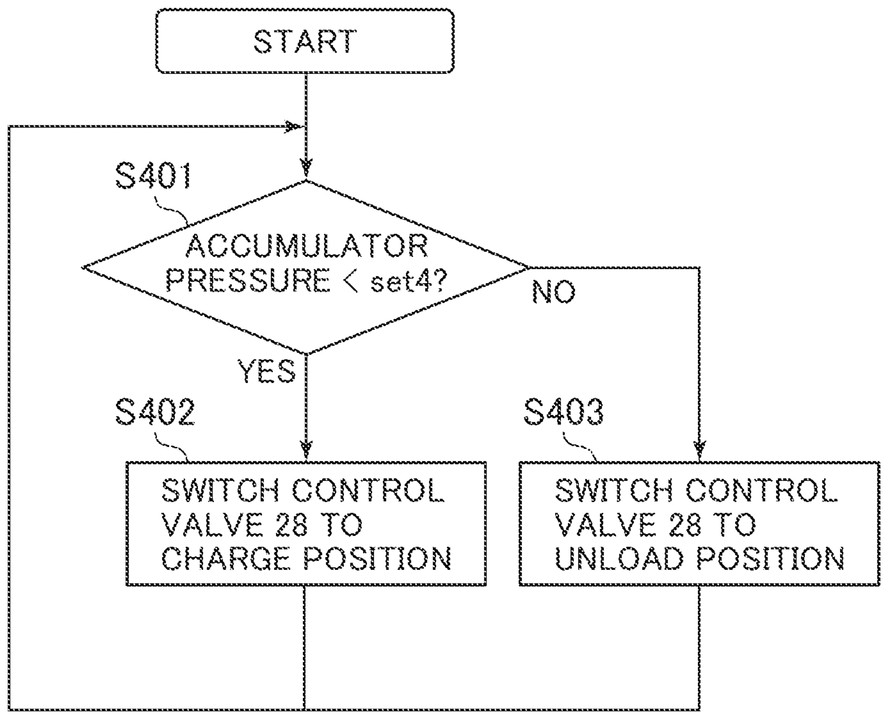
FIG. 6 is a flow chart depicting a control flow relating to pressure accumulation operation of an accumulator on the high pressure side, executed by the controller depicted in FIG. 2.

Now, the substance of processing of the controller 6 is described with reference to FIGS. 3 to 5. FIG. 3 represents a control flow relating to driving of the boom cylinder 1; FIG. 4 represents a control flow relating to regeneration operation of the swing motor 22; FIG. 5 represents a control flow relating to pressure accumulation operation of the accumulator 4 on the low pressure side; and FIG. 6 represents a control flow relating to pressure accumulation operation of the accumulator 21 on the high pressure side. The control flows are started, for example, when a key switch not depicted is switched ON and are executed concurrently.

First, the control flow relating to driving of the boom cylinder 1 is described with reference to FIG. 3.

The controller 6 first decides whether or not a boom raising operation signal is inputted thereto from the boom operation lever 5 (step S101).

When a decision of Yes (a boom raising operation signal is inputted) is made in step S101, the controller 6 decides whether or not a bottom pressure of the boom cylinder 1 sensed by the pressure sensor 9 is higher than a predetermined pressure set1 (step S102).

When a decision of Yes (the bottom pressure of the boom cylinder 1 is higher than the predetermined pressure set1) is made in step S102, the controller 6 opens the control valves 3 and 19 while leaving the control valves 2 and 7 closed (step S103), and returns the processing to step S101. Consequently, hydraulic fluid is supplied from the accumulator 21 on the high pressure side to the bottom side of the boom cylinder 1 while hydraulic fluid on the rod side is discharged to the tank 40, and thereupon, the boom cylinder 1 performs elongation operation.

When a decision of No (the bottom pressure of the boom cylinder 1 is equal to or lower than the predetermined pressure set1) is made in step S102, the controller 6 opens the control valves 2 and 3 while leaving the control valves 7 and 19 closed (step S104), and returns the processing step S101. Consequently, hydraulic fluid is supplied from the accumulator 4 on the low pressure side to the bottom side of the boom cylinder 1 and hydraulic fluid on the rod side is discharged to the tank 40, and thereupon, the boom cylinder 1 performs elongation operation.

When a decision of No (a boom raising signal is not inputted) is made in step S101, the controller 6 decides whether or not a boom lowering operation signal is inputted from the boom operation lever 5 (step S105).

When a decision of Yes (a boom lowering operation signal is inputted) is made in step S105, the controller 6 opens the control valves 2 and 7 while leaving the control valves 3 and 19 closed (step S106), and returns the processing to step S101. Consequently, hydraulic fluid discharged from the bottom side of the boom cylinder 1 is partly accumulated into the accumulator 4 via the control valve 2 while the remaining part of the hydraulic fluid is supplied to the rod side of the boom cylinder 1 via the control valve 7, and thereupon, the boom cylinder 1 performs contraction operation.

When a decision of No (a boom lowering pilot pressure Pd is not sensed) is made in step S105, the controller 6 closes the control valves 2, 3, 7, and 10 (step S107) and returns the processing to step S101. Consequently, all of the hydraulic lines that supply and discharge hydraulic fluid to and from the boom cylinder 1 are all interrupted, and therefore, the boom cylinder 1 is kept in a stationary state.

By the control flow described above, when the bottom pressure of the boom cylinder 1 is low, the accumulator 4 on the low pressure side is connected to the bottom side, but when the bottom pressure is high, the accumulator 21 on the high pressure side is connected to the bottom side. Consequently, pressure loss when hydraulic fluid is supplied from the accumulators 4 and 21 to the bottom side of the boom cylinder 1 is suppressed, and it is possible to efficiently drive the boom cylinder 1 for elongation.

Now, the control flow relating to regeneration operation of the swing motor 22 is described with reference to FIG. 4.

The controller 6 first decides whether or not a pressure of the swing motor 22 (swing motor pressure) sensed by the pressure sensor 25 is higher than a predetermined pressure set2 (step S201). The predetermined pressure set2 here is set to a value equal to or higher than a set pressure set3 for the accumulator 21 hereinafter described.

When a decision of Yes (the swing motor pressure is higher than the predetermined pressure set2) is made in step S201, the controller 6 opens the control valve 20 (step S202) and returns the processing to step S201. Consequently, the return side of the swing motor 22 is connected to the accumulator 21 such that energy upon deceleration of the swing structure 102 is regenerated.

When a decision of No (the swing motor pressure is equal to or lower than the predetermined pressure set2) is made in step S201, the controller 6 closes the control valve 20 (step S202) and returns the processing to step S201.

Now, the control flow relating to pressure accumulation operation of the accumulator 4 on the low pressure side is described with reference to FIG. 5.

The controller 6 first decides whether or not a pressure of the accumulator 4 (accumulator pressure) sensed by the pressure sensor 30 is lower than a predetermined pressure set3 (step S301). The predetermined pressure set3 here is a set pressure for the accumulator 4 and is set to a value lower than a set pressure set4 for the accumulator 21 hereinafter described.

When a decision of Yes (the accumulator pressure is lower than the predetermined pressure set3) is made in step S301, the controller 6 switches the control valve 26 to the charge position 26*b* to connect the delivery port of the hydraulic pump 27 to the accumulator 4 (step S302) and returns the processing to step S301. Consequently, the delivery hydraulic fluid of the hydraulic pump 27 is accumulated into the accumulator 4, and the pressure of the accumulator 4 is kept equal to or higher than the predetermined pressure set3.

When a decision of No (the accumulator pressure is equal to or higher than the predetermined pressure set3) is made in step S301, the controller 6 switches the control valve 26 to the unload position 26*a* side to connect the delivery port of the hydraulic pump 27 to the tank 40 (step S303) and returns the processing to step S301. Consequently, the pressure of the accumulator 4 is not accumulated more than necessary by the hydraulic pump 27, and therefore, unnecessary energy consumption can be suppressed.

Now, the control flow relating to pressure accumulation operation of the accumulator 21 is described with reference to FIG. 6.

The controller 6 first decides whether or not a pressure of the accumulator 21 (accumulator pressure) sensed by the pressure sensor 31 is lower than a predetermined pressure set4 (step S401). The predetermined pressure set4 here is a set pressure for the accumulator 21 and is set to a value higher than the set pressure set4 for the accumulator 4.

When a decision of Yes (the accumulator pressure is lower than the predetermined pressure set4) is made in step S401, the controller 6 switches the control valve 28 to the charge position 26*b* to connect the delivery port of the hydraulic pump 29 to the accumulator 21 (step S402) and returns the processing to step S401. Consequently, delivery hydraulic fluid of the hydraulic pump 29 is accumulated into the accumulator 21, and the pressure of the accumulator 21 is kept equal to or higher than the predetermined pressure set4.

When a decision of No (the accumulator pressure is equal to or higher than the predetermined pressure set4) is made in step S401, the controller 6 switches the control valve 28 to the unload position 28*a* to connect the delivery port of the hydraulic pump 29 to the tank 40 (step S402) and returns the processing to step S401. Consequently, hydraulic fluid is not accumulated more than a necessary pressure into the accumulator 21 by the hydraulic pump 29, and therefore, unnecessary energy consumption can be suppressed.

(Operation)

Operation of the hydraulic drive system 200 is described with reference to FIG. 2.

First, operation of the swing structure 102 is described.

If the swing operation lever 18 is operated, then the controller 6 decides in which one of the rightward direction and the leftward direction the swing structure 102 is to be swung and switches the directional control valve 14 from the neutral position to the left or right position. The hydraulic pump 13 supplies hydraulic fluid to the swing motor 22 via the directional control valve 14 to swing the swing structure 102. If the swing operation lever 18 is returned to its neutral position, then the directional control valve 14 returns to its neutral position, and thereupon, the pressure on the return side of the swing motor 22 increases to decelerate the swing structure 102. At this time, return fluid of the swing motor 22 flows into the hydraulic line 44 via the check valve 23 or the check valve 24. Then, if the pressure of the hydraulic line 44 sensed by the pressure sensor 25 exceeds the predetermined pressure set2, then the controller 6 opens the control valve 20. Consequently, return fluid of the swing motor 22 is accumulated into the accumulator 21 and braking energy of the swing structure 102 is recovered.

Now, lowering operation of the boom 105 (contraction operation of the boom cylinder 1) is described.

If the boom operation lever 5 is operated in the boom lowering direction, then the controller 6 opens the control valve 7 to establish communication of the bottom side with the rod side of the boom cylinder 1 to raise the pressure in the boom cylinder 1. Simultaneously, the controller 6 opens the control valve 2 such that return fluid on the bottom side of the boom cylinder 1 is accumulated into the accumulator 4. Consequently, the boom cylinder 1 is contracted, and thereupon, the boom 105 performs lowering operation and potential energy of the boom 105 is recovered.

Now, raising operation of the boom 105 (extension operation of the boom cylinder 1) is described.

If the boom operation lever 5 is operated in the boom raising direction, then the controller 6 opens the control valve 3 to establish communication of the rod side of the boom cylinder 1 with the tank 40 and opens one of the control valves 2 and 19 in response to the bottom pressure of the boom cylinder 1. In particular, the controller 6 opens the control valve 2 when the bottom pressure is equal to or lower than the predetermined pressure set1 but opens the control valve 19 when the bottom pressure is higher than the predetermined pressure set1. Consequently, when the bottom pressure is equal to or lower than the predetermined pressure set1, the accumulator 21 on the low pressure side is connected to the bottom side, but when the bottom pressure is higher than the predetermined pressure set1, the accumulator 4 on the high pressure side is connected to the bottom side. Then, hydraulic fluid is supplied from the accumulators 4 and 21 to the bottom side of the boom cylinder 1 to extend the boom cylinder 1, and thereupon, the boom 105 performs raising operation. Since pressure loss when hydraulic fluid is supplied from the accumulators 4 and 21 to the boom cylinder 1 is suppressed by switching the connection between the accumulators 4 and 21 and the boom cylinder 1 in response to the bottom pressure of the boom cylinder 1 as described above, it is possible to efficiently drive the boom cylinder 1. It is to be noted that, since the accumulators 4 and 21 are kept equal to or higher than their set pressures by the hydraulic pumps 27 and 29, respectively, the boom cylinder 1 can be driven at an optional timing.

(Advantage)

In the present embodiment, a construction machine 100 that includes the hydraulic cylinder 1, the first accumulator 4 that accumulates return fluid from the hydraulic cylinder 1 with the first set pressure set3, the tank 40 that stores hydraulic fluid therein, the first hydraulic pump 13 that delivers the hydraulic fluid sucked from the tank 40, the hydraulic actuator 22 that is driven by the first hydraulic pump 13, and the second accumulator 21 that accumulates return fluid from the hydraulic actuator 22 with the second set pressure set4, includes the first control valve 2 placed in the first hydraulic line 41 that connects the first accumulator 4 and the hydraulic cylinder 1 to each other, and the second control valve 19 placed in the second hydraulic line 45 that connects the second accumulator 21 and the hydraulic cylinder 1 to each other, in which the second set pressure set4 is set to a value higher than that of the first set pressure set3.

According to the present embodiment configured in such a manner as described above, by opening one of the first control valve 2 and the second control valve 19, it is possible to connect one of the first accumulator 4 on the low pressure side and the second accumulator 21 on the high pressure side to the hydraulic cylinder 1. Consequently, since pressure loss when hydraulic fluid is supplied from the first accumulator 4 or the second accumulator 21 to the hydraulic cylinder 1 is suppressed, the hydraulic cylinder 1 can be driven efficiently.

Further, the construction machine 100 according to the present embodiment further includes the first pressure sensor 9 that senses the pressure of the hydraulic cylinder 1, and the controller 6 that receives the pressure signal inputted thereto from the first pressure sensor 9 and outputs control signals to the first control valve 2 and the second control valve 19, in which the controller 6 controls the first control valve 2 and the second control valve 19 in response to the pressure of the hydraulic cylinder 1.

By such a configuration as just described, it is possible to select one of the accumulators 4 and 21 to be connected to the hydraulic cylinder 1 in response to the pressure of the hydraulic cylinder 1. Consequently, since pressure loss when hydraulic fluid is supplied from the accumulators 4 and 21 to the boom cylinder 1 is suppressed, it is possible to drive the boom cylinder 1 efficiently.

Further, the controller 6 in the present embodiment controls such that, in a case where the pressure of the hydraulic cylinder 1 is higher than the first set pressure set3, the first control valve 2 is closed and the second control valve 19 is opened, and in a case where the pressure of the hydraulic cylinder 1 is equal to or lower than the first set pressure set3, the second control valve 19 is closed and the first control valve 2 is opened.

By such a configuration as just described, when the pressure of the hydraulic cylinder 1 is equal to or lower than the first set pressure set3, the first accumulator 4 on the low pressure side is connected to the hydraulic cylinder 1, but when the pressure of the hydraulic cylinder 1 is higher than the first set pressure set3, the second accumulator 21 on the high pressure side is connected to the hydraulic cylinder 1. Consequently, since pressure loss when hydraulic fluid is supplied from the accumulators 4 and 21 to the boom cylinder 1 is suppressed, the boom cylinder 1 can be driven efficiently.

Further, the construction machine 100 according to the present embodiment further includes the second hydraulic pump 27, the second pressure sensor 30 that senses the pressure of the first accumulator 4, and the third control valve 26 capable of switching, in response to a control signal from the controller 6, the delivery port of the second hydraulic pump 27 between the charge position 26*b* in which the delivery port of the second hydraulic pump 27 is connected to the first accumulator 4 and the unload position 26*a* in which the delivery port of the second hydraulic pump 27 is connected to the tank 40, in which the controller 6 controls the third control valve 26 such that, in a case where the pressure of the first accumulator 4 is lower than the first set pressure set3, the third control valve 26 is switched to the charge position 26*b*, and in a case where the pressure of the first accumulator 4 is equal to or higher than the first set pressure set3, the third control valve 26 is switched to the unload position 26*a*.

By such a configuration as just described, the pressure of the first accumulator 4 can be kept equal to or higher than the first set pressure set3. Further, since pressure accumulation of the first accumulator 4 is not performed more than necessary by the second hydraulic pump 27, unnecessary energy consumption can be suppressed.

Further, the construction machine 100 according to the present embodiment further includes the third hydraulic pump 29, the third pressure sensor 31 that senses the pressure of the second accumulator 21, and the fourth control valve 28 capable of switching, in response to a control signal from the controller 6, the delivery port of the third hydraulic pump 29 between the charge position 28*b* in which the delivery port of the third hydraulic pump 29 is connected to the second accumulator and the unload position 28*a* in which the delivery port of the third hydraulic pump 29 is connected to the tank 40, in which the controller 6 controls the fourth control valve 28 such that, in a case where the pressure of the second accumulator 21 is lower than the second set pressure set4, the fourth control valve 28 is switched to the charge position 28*b*, and in a case where the pressure of the second accumulator 21 is equal to or higher than the second set pressure set4, the fourth control valve 28 is switched to the unload position 28*a*.

By such a configuration as just described, the pressure of the second accumulator 21 can be set equal to or higher than the second set pressure set4. Further, since pressure accumulation into the second accumulator 21 is not performed more than necessary by the hydraulic pump 29, unnecessary energy consumption can be suppressed.

Although the embodiment of the present invention has been described in detail, the present invention is not restricted to the embodiment described above and includes various modifications. For example, the embodiment described above has been described in detail in order to facilitate understandings of the present invention and is not necessarily restricted to the embodiment that includes all configurations described above.

DESCRIPTION OF REFERENCE CHARACTERS

1: Boom cylinder (hydraulic cylinder)
2: Control valve (first control valve)
3: Control valve
4: Accumulator (first accumulator)
5: Boom operation lever
6: Controller
7: Control valve
9: Pressure sensor (first pressure sensor)
13: Hydraulic pump (first hydraulic pump)
14: Directional control valve
18: Swing operation lever
19: Control valve (second control valve)
20: Control valve
21: Accumulator (second accumulator)
22: Swing motor (hydraulic actuator)
23: Check valve
24: Check valve
25: Pressure sensor
26: Control valve (third control valve)
26*a*: Unload position
26*b*: Charge position
27: Hydraulic pump (second hydraulic pump)
28: Control valve (fourth control valve)
28*a*: Unload position
28*b*: Charge position
29: Hydraulic pump (third hydraulic pump)
30: Pressure sensor (second pressure sensor)
31: Pressure sensor (third pressure sensor)
40: Tank
41: Hydraulic line (first hydraulic line)
42 to 44: Hydraulic line
45: Hydraulic line (second hydraulic line)
46 to 49: Hydraulic line
100: Hydraulic excavator (construction machine)
101: Track structure
102: Swing structure
103: Work implement
105: Boom
106: Arm
107: Bucket
108: Arm cylinder
109: Bucket cylinder
110: Operation room
111: Counterweight
112: Machine room
113: Control valve
200: Hydraulic drive system

The invention claimed is:

1. A construction machine that includes:

a hydraulic cylinder;

a first accumulator that accumulates return fluid from the hydraulic cylinder with a first set pressure;

a tank that stores hydraulic fluid therein;

a first hydraulic pump that delivers the hydraulic fluid sucked from the tank;

a hydraulic actuator that is driven by the first hydraulic pump; and a second accumulator that accumulates return fluid from the hydraulic actuator with a second set pressure, the construction machine comprising:

a first control valve placed in a first hydraulic line that connects the first accumulator and the hydraulic cylinder to each other; and a second control valve placed in a second hydraulic line that connects the second accumulator and the hydraulic cylinder to each other, wherein the second set pressure is set to a value higher than that of the first set pressure.

2. The construction machine according to claim 1, further comprising:

a first pressure sensor that senses a pressure of the hydraulic cylinder; and a controller that receives a pressure signal inputted thereto from the first pressure sensor and outputs control signals to the first control valve and the second control valve, wherein the controller is configured to control the first control valve and the second control valve in response to the pressure of the hydraulic cylinder.

3. The construction machine according to claim 2, wherein the controller is configured to control such that, in a case where the pressure of the hydraulic cylinder is higher than the first set pressure, the first control valve is closed and the second control valve is opened, and in a case where the pressure of the hydraulic cylinder is equal to or lower than the first set pressure, the second control valve is closed and the first control valve is opened.

4. The construction machine according to claim 2, further comprising:

a second hydraulic pump;

a second pressure sensor that senses a pressure of the first accumulator; and a third control valve capable of switching, in response to a control signal from the controller, a delivery port of the second hydraulic pump between a charge position in which the delivery port of the second hydraulic pump is connected to the first accumulator and an unload position in which the delivery port of the second hydraulic pump is connected to the tank, wherein the controller is configured to control the third control valve such that, in a case where the pressure of the first accumulator is lower than the first set pressure, the third control valve is switched to the charge position, and in case where the pressure of the first accumulator is equal to or higher than the first set pressure, the third control valve is switched to the unload position.

5. The construction machine according to claim 2, further comprising:

a third hydraulic pump;

a third pressure sensor that senses a pressure of the second accumulator; and a fourth control valve capable of switching, in response to a control signal from the controller, a delivery port of the third hydraulic pump between a charge position in which the delivery port of the third hydraulic pump is connected to the second accumulator and an unload position in which the delivery port of the third hydraulic pump is connected to the tank, wherein the controller is configured to control the fourth control valve such that, in a case where the pressure of the second accumulator is lower than the second set pressure, the fourth control valve is switched to the charge position, and in a case where the pressure of the second accumulator is equal to or higher than the second set pressure, the fourth control valve is switched to the unload position.

* * * * *